United States Patent [19]

Amasaki et al.

[11] Patent Number: 5,218,525
[45] Date of Patent: Jun. 8, 1993

[54] METHOD AND APPARATUS FOR PARTIALLY RUNNING A SEQUENCE PROGRAM FOR DEBUGGING THEREOF

[75] Inventors: Shinichi Amasaki; Hiroyuki Hayashi, both of Aichi, Japan

[73] Assignee: Mitsubishi Denki K.K., Tokyo, Japan

[21] Appl. No.: 652,751

[22] Filed: Feb. 8, 1991

[30] Foreign Application Priority Data

Feb. 22, 1990 [JP] Japan .................................. 2-41501

[51] Int. Cl.⁵ ..................... G06F 15/46; G05B 23/02
[52] U.S. Cl. .................................. 364/140; 364/184;
364/DIG. 1; 364/221; 364/266.4; 364/267.91;
364/DIG. 2; 364/926.9; 364/949; 371/16.5;
371/29.1; 395/275; 395/575
[58] Field of Search ............ 364/140, 141, 184–187,
364/146, 147, DIG. 6, DIG. 2 MS File;
371/16.1, 16.5, 24, 25.1, 29.1, 71; 395/275, 500,
575

[56] References Cited

U.S. PATENT DOCUMENTS

| | | | |
|---|---|---|---|
| 4,542,452 | 9/1985 | Fukai et al. | 364/186 X |
| 4,608,628 | 8/1986 | Saito et al. | 371/29.1 X |
| 4,851,985 | 7/1989 | Burror et al. | 371/16.5 X |
| 4,852,047 | 7/1989 | Lavalee et al. | 364/191 |
| 5,068,778 | 11/1991 | Kosem et al. | 364/138 |
| 5,070,476 | 12/1991 | Fujiwara | 364/140 X |

FOREIGN PATENT DOCUMENTS 2948644 6/1981 European Pat. Off. .
2593621 7/1987 France .
60-120410 6/1985 Japan .

OTHER PUBLICATIONS

Electronic Design, vol. 34, No. 28, Nov. 27, 1986, Hasbrouck Heights, N.J., USA, pp. 125–128; Bruce Ableidinger: "Software analyzers team up to track down complex bugs", p. 126, right col. lines 15-20.

*Primary Examiner*—Joseph Ruggiero
*Attorney, Agent, or Firm*—Sughrue, Mion, Zinn, Macpeak & Seas

[57] ABSTRACT

A method and apparatus for debugging a sequence program by partially running the program by a programmable controller. The programmable controller includes memory to store the sequence program and memory to store partial run conditions comprising identity of a external device required for a partial run of the sequence program, a device access method and relevant data. An external i/o device interfaces with the programmable controller to store the partial run condition. The programmable controller includes a compare circuit for comparing the stored partial run conditions and the status of the program during a partial run. The comparison circuit outputs a signal which stops the run when the result of the sequence program operation is identical with the stored partial run conditions. The stop step and number of scans of the sequence program at the time the match is identified can be output for example, on a display.

14 Claims, 5 Drawing Sheets

| ENTRY MEMORY | ENTERED DATA |
|---|---|
| DATA | 9 |
| DEVICE | X |
| ACCESS METHOD | WRITE |

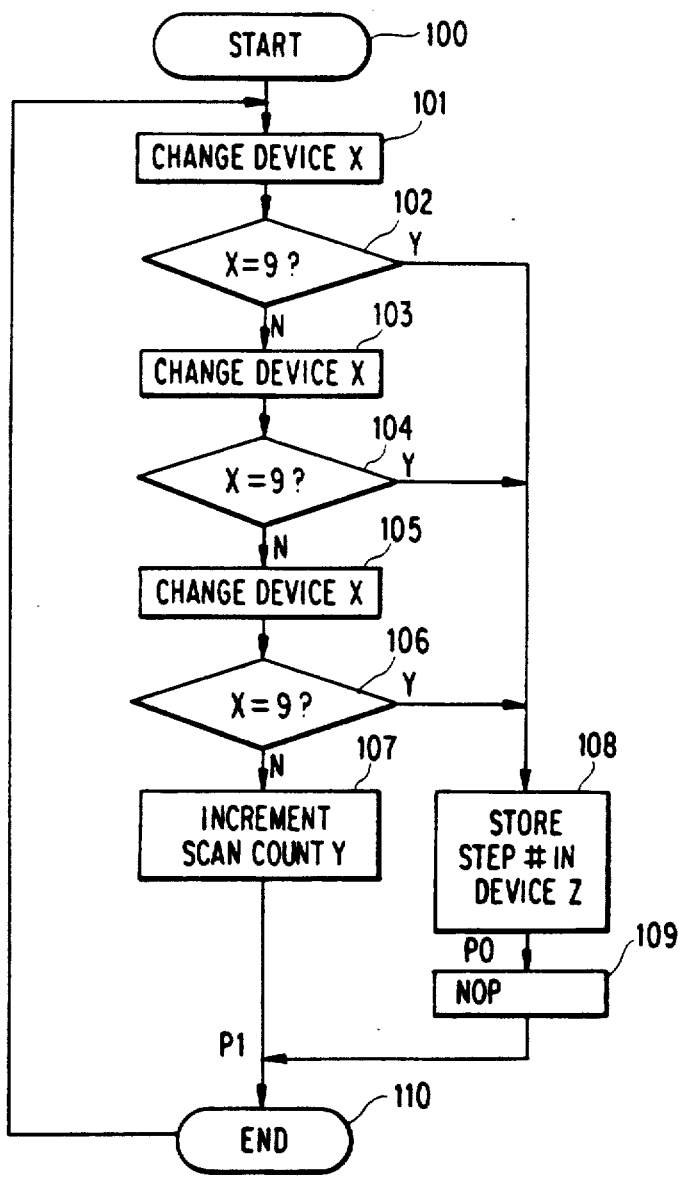

METHOD AND APPARATUS FOR PARTIALLY RUNNING A SEQUENCE PROGRAM FOR DEBUGGING THEREOF

BACKGROUND OF THE INVENTION

1. Field of the Invention

This invention relates to a programmable controller and particularly to a method of debugging a sequence program.

2. Description of the Backqround Art

A programmable controller (hereinafter referred to as a "PC") is employed to control an object by means of a computer program. In practice, many PCs are used to control a wide variety of devices, machines and actuators in a broad spectrum of environments, e.g. processing plants, manufacturing facilities and the like.

FIG. 6 is a hardware configuration diagram of a conventional PC 10, wherein a CPU 11 is connected by a bus 18 to an OS 12 defining the operation of the CPU 11. A sequence program memory 13, which allows a user to store a user-written sequence program (hereinafter referred to as the "sequence program") for subsequent access, also is connected to the bus 18. A device memory 14 serves as an internal memory which allows the user to transfer data, as required. The user writes a sequence program by means of an external device 16 for input into the sequence program memory 13 via a communication interface 15. The external device 16, which allows the sequence program to be created, also permits data from the device memory 14 to be monitored and displayed. The monitoring capability is not illustrated but, as would be understood by one of ordinary skill, a monitor can indicate changes that occur as a result of a sequence program executed in accordance with a program running method. From external device 16, a full program run or a partial run command for the sequence program can be transmitted to the CPU 11.

A "partial run" of the sequence program is conducted when the sequence program is run instruction-by-instruction at particular instruction steps of the sequence program, is run up to a specified instruction step, or is run until it reaches a specified instruction step a specified number of times. Generally, a partial run is employed when debugging the sequence program without connecting the PC 10 to an object to be controlled (not illustrated) after the user has created the sequence program. The partial run permits efficient debugging since only the portions of a program that are of interest need be executed for test purposes. During the run, the program may operate to access or control any of several external devices $D_x$, e.g. disk drives, modems etc. interfaced into the PC system, each being identified by a unique number "x".

FIG. 7 shows an example of a sequence program segment in the form of a ladder diagram and is useful in illustrating partial run of a sequence program. The sequence program segment shown in FIG. 7 is operative to run until the identifier X for the selected one of the several external devices $D_x$ changes to "9". Specifically, parameter values of $X = 9$ are set at each of program steps 52, 54 and 56, which are followed by respective condition instructions 58. When run, the program permits an identification of the program step and scan at which the sequence program is stopped by means of the external device 16. For this purpose, a "scan" will be understood as the activity beginning with the execution of an instruction step 0 and proceeding to the occurrence of an END instruction that is followed by another instruction step 0 in the sequence program.

FIG. 8 is a flowchart illustrating a sequence for running the sequence program shown in FIG. 7.

Operation will now be described with reference to FIGS. 7 and 8 where X identifies a external device $D_x$, Y identifies the number of scans and Z identifies a current program step number. In FIG. 8, the partial run of the sequence program is started at sequence step 100. Data X, identifying the external device $D_x$, is changed at sequence step 101, i.e. $X = 1$ is obtained by executing $X = X + 1$ (initial value $X = 0$) at program step 51 in FIG. 7. Then, whether $X = 9$ or not is judged at sequence step 102, i.e. program step 52 in FIG. 7 is executed. If $X = 9$, the operation proceeds to sequence step 108 where the current program step number is stored in an external storage device $D_z$, i.e. program step 58 in FIG. 7 is executed. However, since $X = 1$ in this case, sequence step 103, i.e. program step 53 in FIG. 7, is executed and $X = 3$ is obtained according to $X = X + 2$. Then, whether $X = 9$ or not is judged again at sequence step 104, i.e. program step 54 in FIG. 7 is executed. Since X is not 9, sequence step 105, i.e. program step 55 in FIG. 7, is executed and $X = 6$ is obtained according to $X = X + 3$. Then, whether $X = 9$ or not is judged again at sequence step 106, i.e. program step 56 in FIG. 7 is executed. Since X is not 9, sequence step 107, i.e. program step 57 in FIG. 7, is executed and "1" is added to an external storage device $D_y$ which counts the number of scans. If it is assumed that the external device $D_y$ already stores an initial value of $Y = 1$, indicating the conduct of a first scan, $Y = 2$ is obtained according to $Y = Y + 1$. In FIG. 7, "INC Y" indicates the addition of 1 to the device $D_y$, i.e. execution of $Y = Y + 1$, and "JMP P1" indicates an instruction which causes a jump to instruction step P1, i.e. an END instruction step 60.

The operation then executes the END processing at sequence step 110, i.e. program step 60 in FIG. 7, returns to the instruction step 0, i.e. sequence step 101, thereby completing a "scan" sequence, and repeats the processing. As a result of the first scan sequence, for the second scan, the value of the device $D_z$ changes to $X = 7$ according to $X = X + 1$ at the sequence step 101, i.e. the program step 51 in FIG. 7. X will become equal to 9 according to $X = X + 2$ at sequence step 103, i.e. upon execution of program step 53 in FIG. 7. Therefore, $X = 9$ is established at sequence step 104, i.e. when at program step 54 in FIG. 7. As a result, a program step number, i.e. $Z = 2$ in this case, is stored in device $D_z$ at sequence step 108, i.e. program step 58 in FIG. 7, and the operation jumps to instruction step P0.

Clearly, the operation is only caused to jump to instruction step P0 when the device identifier value X changes to "9". Thus, the setting of a "break point", i.e. a position to stop the sequence program, at instruction step P0 in advance allows the number of stop scans (Y) and a stop step (Z) to be identified. The device $D_y$, which stores the number of scans Y, and device $D_z$, which stores the stop step number Z at which the execution of the sequence program is to be stopped, can be used to control other operations. An NOP program step 59 in FIG. 7 indicates that instruction step P0 is a no-operation instruction and does not have any influence on the program control. JMP P1 in program step 57 causes a jump to instruction step P1, the END instruction.

However, when it is desired to change device data, the partial run may be performed only after adding (or changing) corresponding relative program steps. Specifically, it is necessary to add the program steps 52 and 58, the program steps 54 and 58, and the program steps 56 and 58 in correspondence with the program steps 51, 53 and 55 shown in FIG. 7, respectively. Therefore, the sequence program must be increased by six program steps and, as a result, becomes complicated and inefficient.

Also in this conventional technique, if it must be determined whether X or some other parameter has taken a particular value, an interrogation of the system for that criterion was required at each step. Such determination would have been made by checking whether a particular address has particular data values, thereby requiring extensive processing time.

SUMMARY OF THE INVENTION

It is, accordingly, an object of the present invention to overcome the disadvantages in the background art by providing a new process of partially running the PC and the sequence program. It is a further object of the present invention to permit a partial run of the sequence program without adding extra program steps.

A PC of a first embodiment of the present invention comprises: a program running means for running a sequence program composed of a plurality of instruction steps, a partial run condition entering means for entering beforehand partial run conditions comprising the identity of a external device required for the partial run of the sequence program, a external device access method (read/write) for the external device, and specified data; a comparing means for comparing the partial run conditions and sequence program running results and outputting a signal for stopping the run of the sequence program by the program running means when the partial run conditions match the sequence program running results; and a displaying means for displaying the stop step and the number of scans of the sequence program.

In accordance with the first embodiment of the present invention, the program running means runs the sequence program, the partial run condition entering means enters beforehand the partial run conditions composed of the specified device required for the partial run of the sequence program, the specified device access method for the specified device and the specified data, the comparing means compares the partial run conditions and the sequence program running results and outputs the signal for stopping the run of the sequence program to the program running means when the partial run conditions match the sequence program running results, and the displaying means displays the stop step and the number of scans of the sequence program.

A sequence program partial running process of the present invention for partially running a sequence program by means of a PC equipped with a sequence program running means, an inputting means for inputting partial run conditions, as set forth in the first embodiment, and a running result displaying means, comprises: the step of inputting partial run conditions comprising the identity of a external device required for the partial run of the sequence program, a device access method (read/write) for the specified external device, and specified data; the step of running the sequence program by the sequence program running means; the step of stopping the run of the sequence program when the partial run conditions match the sequence program running results; and the step of displaying the stop step and the number of scans of the sequence program using the displaying means.

In accordance with this aspect of the present invention, in partially running the sequence program, the partial run conditions composed of the specified external device required for the partial run of the sequence program, the specified external device access method for the specified device and the specified data are input by the inputting means, the sequence program is run by the running means, the run of the sequence program performed by the running means is stopped when the partial run conditions match the sequence program running results, and the stop step and the number of scans up to that match in the sequence program are displayed by the displaying means.

BRIEF DESCRIPTION OF THE DRAWINGS

FIG. 8 is a flowchart illustrating a processing sequence of a partial run of the sequence program shown in FIG. 7.

DESCRIPTION OF THE PREFERRED EMBODIMENTS

The first and the second embodiments of the present invention will now be described with reference to FIGS. 1 and 2.

Figure 1:
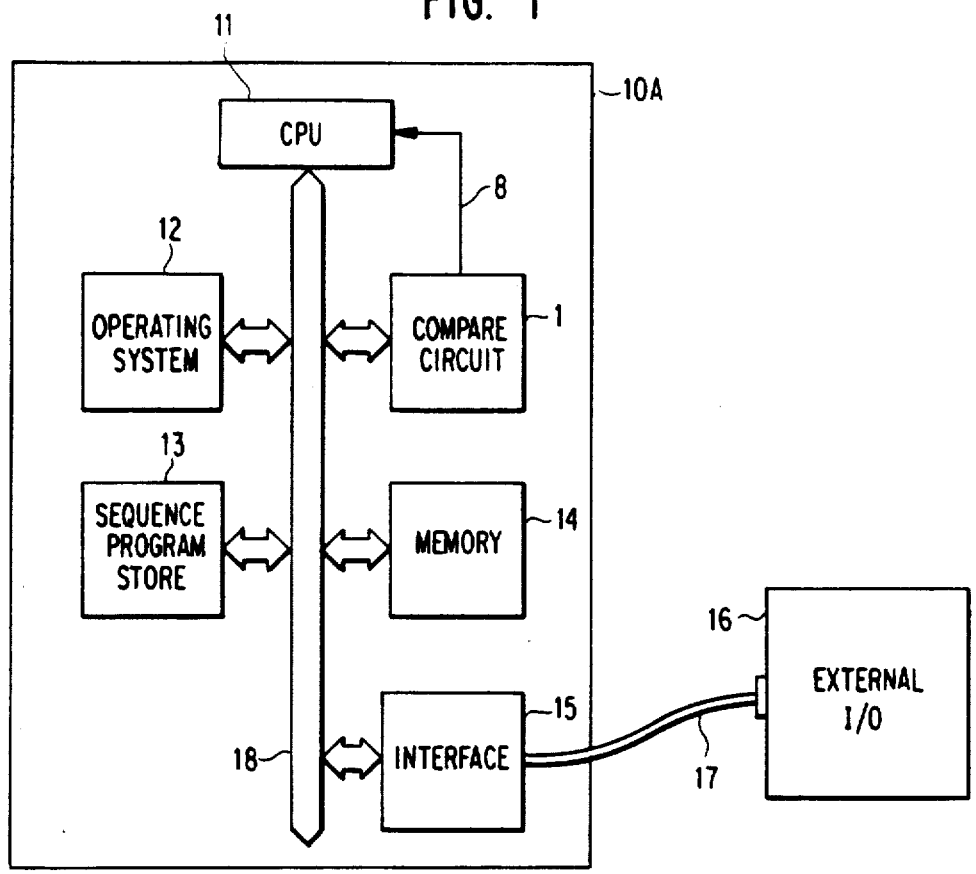
FIG. 1 is a hardware configuration diagram of a PC according to embodiments of the present invention.
Figure 2:
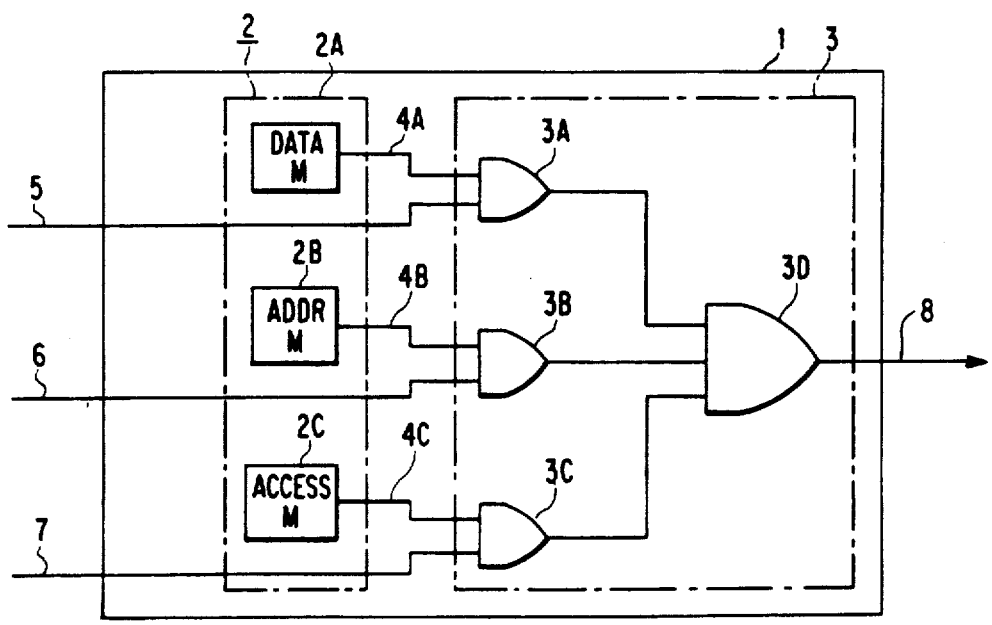
FIG. 2 is a hardware configuration diagram illustrating details of a comparing circuit shown in FIG. 1.

FIG. 1 is a hardware configuration diagram of a PC and FIG. 2 is hardware configuration diagram illustrating details of a comparing circuit area shown in FIG. 1.

Referring to FIG. 1, system components which are the same as those in the conventional PC are identified by identical reference numbers. However, the PC 10A shown in this drawing is different from the PC 10 of the background art shown in FIG. 6 in that the PC 10A includes a comparing circuit 1, having a stop request interrupt line 8, which is connected to CPU 11.

Details of the comparing circuit 1 are shown in FIG. 2. Comparing circuit 1 comprises a sequence program partial run condition entering unit 2, which is composed of a data entry memory 2A, a device entry memory 2B and an access method (read/write) entry memory 2C. A logic circuit 3, which is composed of four AND elements 3A to 3D connected in a tree configuration, completes the comparing circuit. A data bus 5 is connected to the AND element 3A together with an output line 4A of the data entry memory 2A. An address bus 6 is connected to the AND element 3B together with an output line 4B of the device entry memory 2B. A control bus 7 is connected to the AND element 3C together with an output line 4C of the access method (read/- write) entry memory 2C. The data entry memory 2A and the data bus 5, the device entry memory 2B and the address bus 6, and the access method (read/write) entry memory 2C and the control bus 7 are ANDed by the AND elements 3A to 3C, respectively. The output from these three AND elements are further ANDed by the AND element 3D, and its output is entered into the CPU 11 via the stop request interrupt line 8. If the output of the AND element 3D is high, i.e. "1", it is a sequence program stop request to the CPU 11. If the output is low, i.e. "0", no stop operation is performed.

Figure 3:
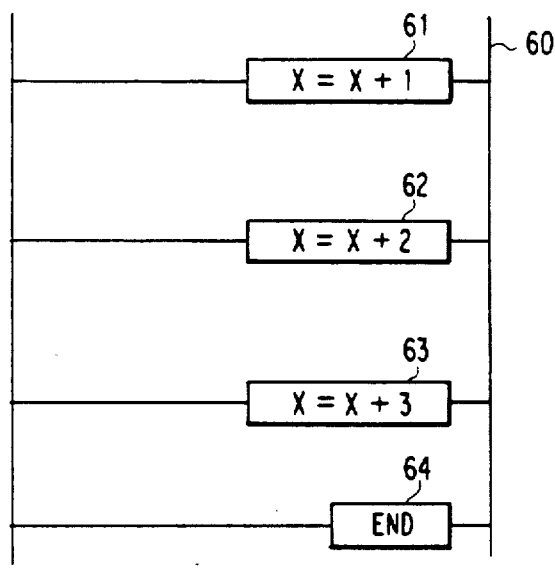
FIG. 3 is a ladder diagram illustrating a sequence program example according to the embodiments of the present invention.
Figure 4:
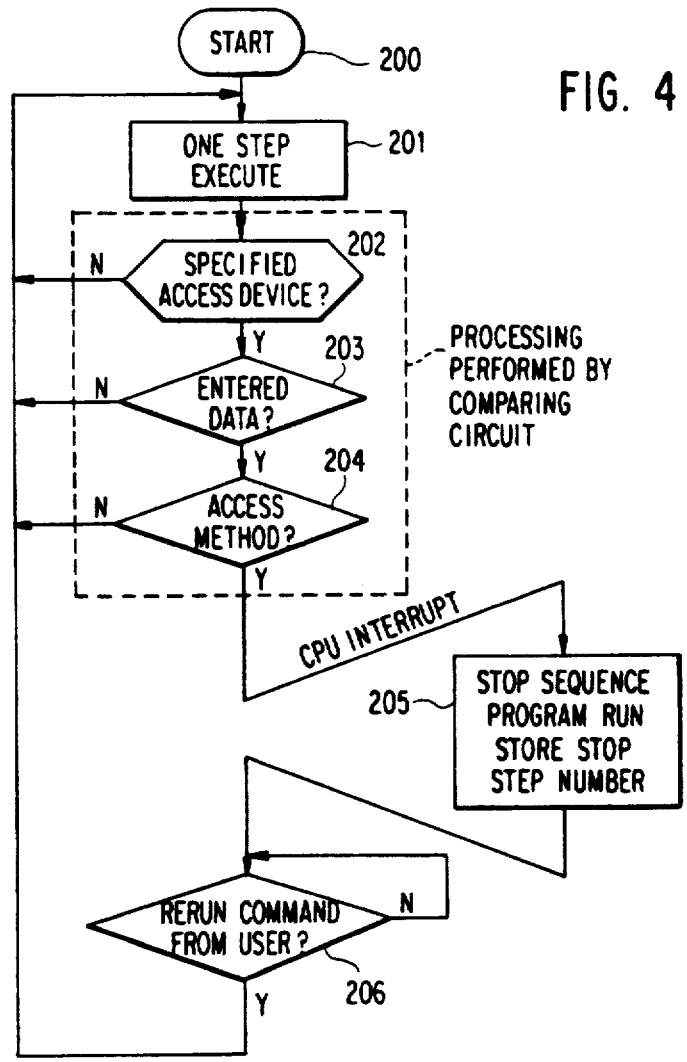
FIG. 4 is a flowchart illustrating a processing sequence of a partial run of the sequence program shown in FIG. 3.
Figure 7:
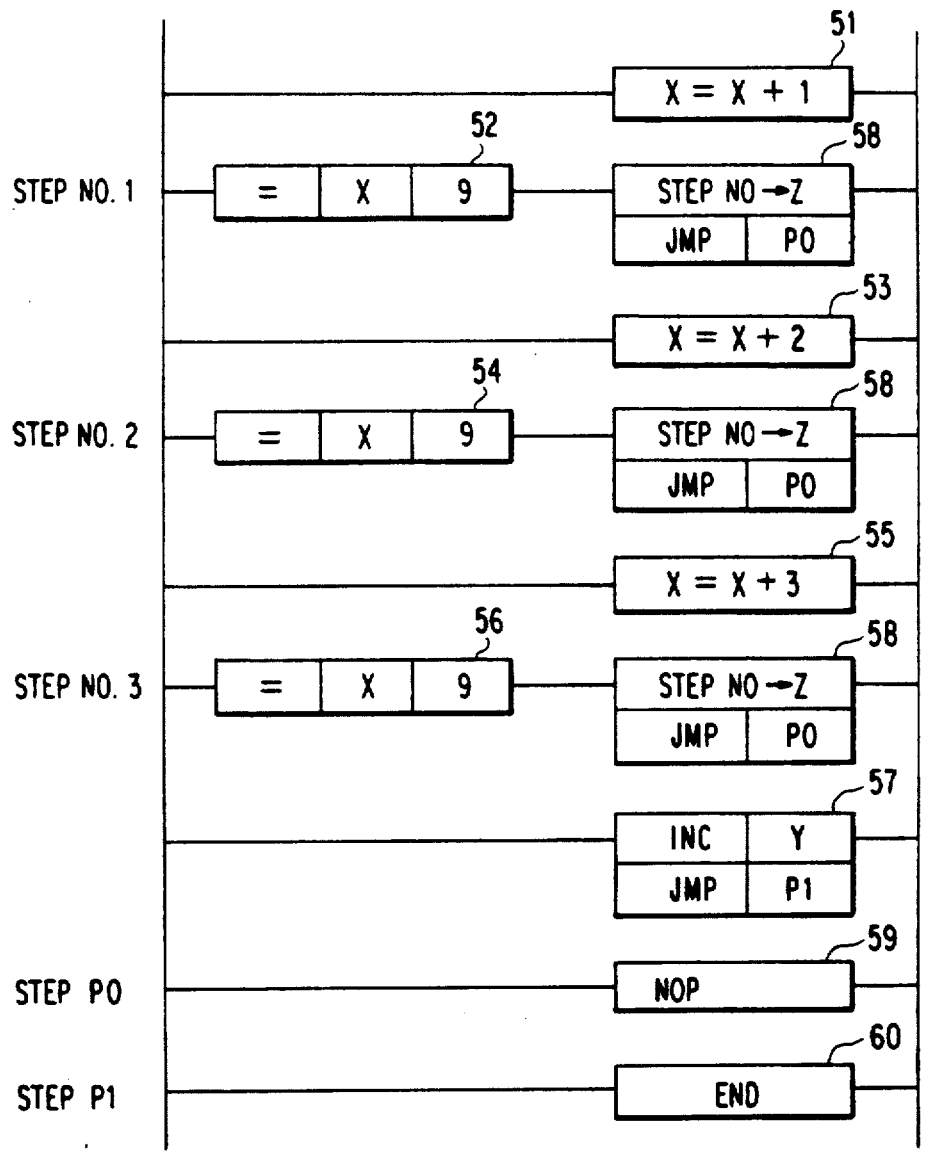
FIG. 7 is a ladder diagram illustrating a sequence program example for use with the conventional PC.

FIG. 3 is a ladder diagram relating to the sequence program partial run process concerned with the present invention and corresponding to the ladder diagram of the background art shown in FIG. 7. FIG. 4 is a flowchart illustrating a sequence of steps for running the sequence program shown in FIG. 3. Operation of the present invention may be described in relation to these drawings.

Figures 5, 6:
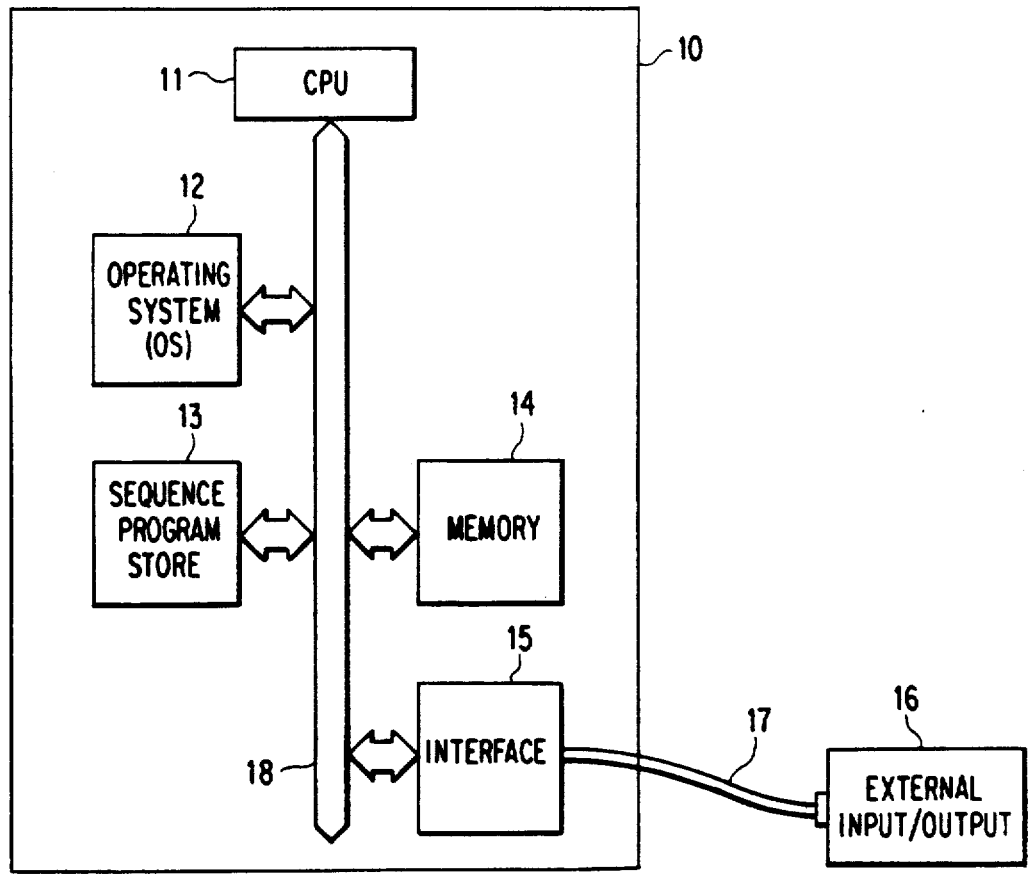
FIG. 5 illustrates partial run condition data to be entered beforehand according to the present invention.
FIG. 6 is a hardware configuration diagram of a conventional PC.

In partially running the sequence program in FIG. 3, partial run conditions of the sequence program, i.e. stopping conditions, including specified data, a specified device and a specified access method (read/write), must be entered by the user beforehand by means of the external device 16. The stopping conditions are placed in the data entry memory 2A, the device entry memory 2B and the access method entry memory 2C in the comparing circuit 1 within the PC 10A, as shown in FIG. 5. After the partial run conditions have been entered into the comparing circuit 1, the PC 10A waits for a partial run command to be provided. When the user transmits the partial run command to the PC 10A by means of the external device 16, the PC 10A commences the partial run.

According to the flowchart in FIG. 4, the partial run of the sequence program is initiated at sequence step 200 and proceeds to sequence step 201 where $X=X+1$ at the first instruction step, i.e. program step 61 in FIG. 3, is executed. Assuming the initial value of the data in the device X is $X=1$, an execution result of $X=2$ is obtained.

The run proceeds to sequence steps 202 to 204, which are concerned with processing of the logic circuit 3 in the comparing circuit 1 shown in FIG. 2. The sequence step 202 judges whether or not an address of the address bus 6 is the address specified to identify the device $D_x$ in the device entry memory 2B and to be entered as an input to the AND element 3B in FIG. 2. The sequence step 203 judges whether or not data of the data bus 5, i.e. the execution result of the sequence step 201, matches the specified data "9" of the data entry memory 2A in the AND element 3A in FIG. 2. The sequence step 204 judges whether or not a command of the control bus 7 in the AND element 3C in FIG. 2 is identical to the access method of the access method entry memory 2C.

The judgement results are ANDed by the corresponding AND elements 3A to 3C and the ANDed results are further ANDed by the AND element 3D. Since the execution result at the sequence step 201 is $X=1$, the AND elements 2B and 3C are switched high or "1". However, the AND element 3C is switched low or "0", because the execution result data does not match the specified data "9" in the AND element 3C. As a result, the AND output by the AND element 3D is low or "0", and the sequence program stop request interrupt to the CPU 11 does not occur. Due to the aforementioned mismatch of the specified data among the partial run conditions at the sequence step 203, the operation returns to the sequence step 201, i.e. executes program step 62 in FIG. 3.

An instruction at the sequence step 201, i.e. program step 62 in FIG. 3, indicates the execution of $X=X+2$, whereby the execution result of $X=3$ is obtained because the data of the device X is "1". A comparison with the entered data at the sequence step 203 results in a mismatch again and the operation returns to the sequence step 201, i.e. progresses to program step 63 in FIG. 3, and executes the instruction $X=X+3$, whereby the execution result of $X=6$ is obtained. However, a comparison with the entered data at the sequence step 203 results in a mismatch again, the operation performs the END processing at step 64, then returns again to the program step 61, i.e. sequence step 201 in FIG. 4, and repeats the processing.

Since the data of the device X is "7" before the execution of the instruction $X=X+2$ at the second program step 62 of the next scan in FIG. 3, the execution result of that instruction is $X=9$, and the comparison with the specified data "9" at the sequence step 203 results in a match. Hence, execution of sequence step 205 after the execution of the sequence step 204 causes the sequence program run to be stopped.

The stop step number and the number of scans executed are stored in an internal memory. That is, the outputs of the AND elements 3A to 3C in FIG. 2 are all switched high or "1". Thus, the ANDed result of these three signals by means of the AND element 3D is high or "1", which generates the sequence program run stop request interrupt to the CPU 11. On receiving the run stop request interrupt, the CPU 11 immediately stops the run of the sequence program in the operating system 12, stores the stop step (X) and the number of scans (Y) between the start of the partial run and the receipt of the stop request interrupt into a memory in the PC 10A which always can be monitored by the external device 16, and waits for a partial rerun command to be provided by the external device 16 at sequence step 206. Since the external device 16 always monitors the two memories, the user can easily identify at which step (X) of which scan (Y) the number "9" has been written and the sequence scan stopped.

By repeating the processing sequence, the partial run can be carried out on the basis of the pre-entered sequence program partial run conditions composed of specified external device, a specified device access method for the specified device and specified data.

It will be appreciated that a stop code may be transmitted from the comparing circuit 1 to the CPU 11 to stop the run of the sequence program when the comparison conditions are established in the comparing circuit 1 instead of the interrupt to the CPU 11 caused by the comparing circuit 1 in the preferred embodiments.

It will be apparent that the invention, as described above, achieves a sequence program partial run process which ensures ease of debugging the sequence program without requiring the addition of any extra program steps. The process allows partial run conditions, comprising a specified external device required for the partial run of the sequence program, a specified device access method and specified data to be entered beforehand. Also, the run of the sequence program may be stopped when there is a correspondence between the partial run conditions and sequence program run results, based on comparisons between them. Finally, the point when the sequence program has stopped and the number of scans conducted up to the point of correspondence can be displayed.

What is claimed is;

1. A programmable controller comprising:
   program running means, connected to a common bus, for controllably running a sequence program composed of a plurality of instruction steps and generating program running results;
   partial run condition entering means, connected to said common bus, for entering, prior to running said sequence program, partial run conditions comprising at least an identity of a external device required for a partial run of said sequence program; and
   a comparing circuit, connected to said common bus and directly to said program running means through a stop request interrupt line, for comparing said partial run conditions and sequence program running results and outputting an interrupt signal to said program running means, through said stop request interrupt line, for stopping the run of said sequence program when said partial run conditions match said sequence program running results.

2. The programmable controller of claim 1, further comprising:
   means for identifying an instruction step at which said sequence program is stopped and a number of scans of said sequence program.

3. The programmable controller of claim 2, further comprising means for displaying said identified stop step and said number of scans.

4. The programmable controller of claim 1 wherein said comparing means comprises logic circuit means, responsive to each of said partial run conditions and said corresponding program running results, for generating an output indicating a coincidence therebetween, said output being operative to stop said run.

5. The programmable controller of claim 1 further comprising means for storing said entered partial run conditions for subsequent access by said comparing means.

6. The programmable controller of claim 1 wherein said partial run conditions further comprise a device access method.

7. A method for partially running a sequence program by means of a programmable controller equipped with sequence program running means connected to a bus, inputting means for inputting run conditions through said bus, a comparison circuit connected to the bus and connected directly to the sequence program running means through a stop request interrupt line, and running result displaying means, comprising the step of:
   inputting, by means of said inputting means, partial run conditions comprising at least a specified device required for the partial run of said sequence program;
   running said sequence program by means of said sequence program running means;
   comparing, by means of the comparison circuit, the partial run conditions and program results; and
   outputting an interrupt signal on said interrupt line to stop the run of said sequence program when said partial run conditions match said sequence program running results.

8. The method of claim 7, further comprising the steps of:
   identifying and storing the instruction step at which said sequence program is stopped and the number of scans of said sequence program.

9. The method of claim 8, further comprising the step of:
   displaying said stop step and number of scans by means of said displaying means.

10. The method of claim 7, wherein said partial run conditions further comprise a device access method.

11. The method of claim 7 further comprising comparing said partial run conditions with the sequence program running results to identify said match.

12. The programmable controller of claim 1, wherein said program running means includes a CPU that is directly connected to said stop request interrupt line.

13. The programmable controller of claim 1, wherein said comparing circuit includes data entry memory for storing data, device entry memory for storing a device identifier and access method entry memory for storing an access method.

14. The programmable controller of claim 13, wherein said common bus includes a data bus, an address bus, and a control bus, and said comparing circuit includes a plurality of AND elements for comparing outputs of said data, device and access method entry memories with outputs of the data, address and control buses, respectively, said comparing circuit outputting said interrupt signal when each corresponding output matches.

* * * * *